Oct. 28, 1930.                C. H. NORTON                1,779,823
                    AUTOMATIC CYLINDRICAL GRINDING MACHINE
                     Filed Sept. 28, 1925      5 Sheets-Sheet 1

WITNESSES
Chas. H. Richards
Harold W. Eaton

INVENTOR
Charles H. Norton
BY
Clayton K. Jenks
ATTORNEY

Oct. 28, 1930.                C. H. NORTON                1,779,823
                   AUTOMATIC CYLINDRICAL GRINDING MACHINE
                   Filed Sept. 28, 1925        5 Sheets-Sheet 2
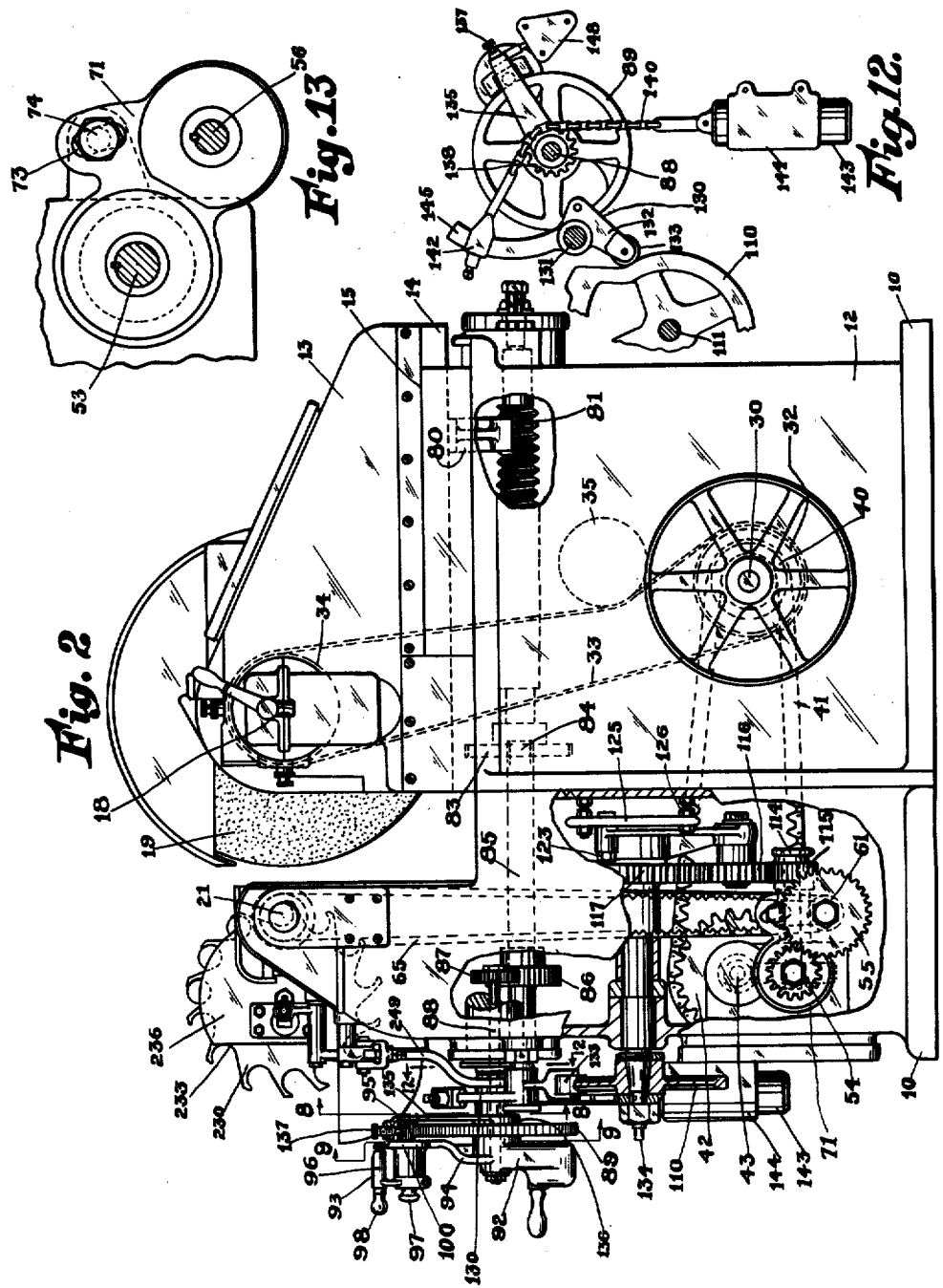
WITNESSES
Chas H Richards
Harold W. Eaton
INVENTOR
Charles H. Norton
BY
Clayton R. Jenks
ATTORNEY

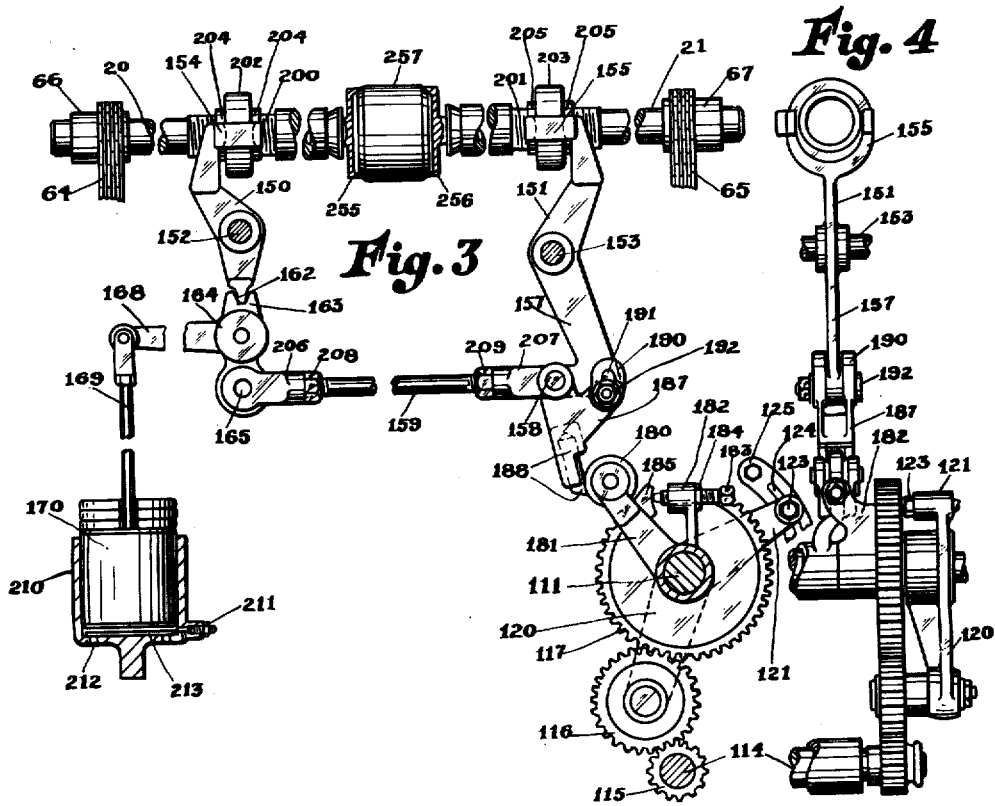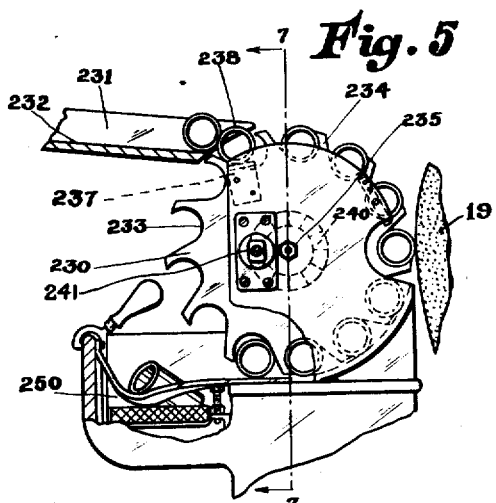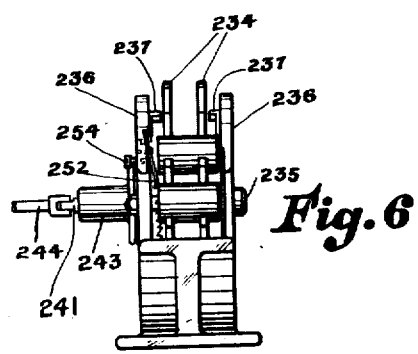

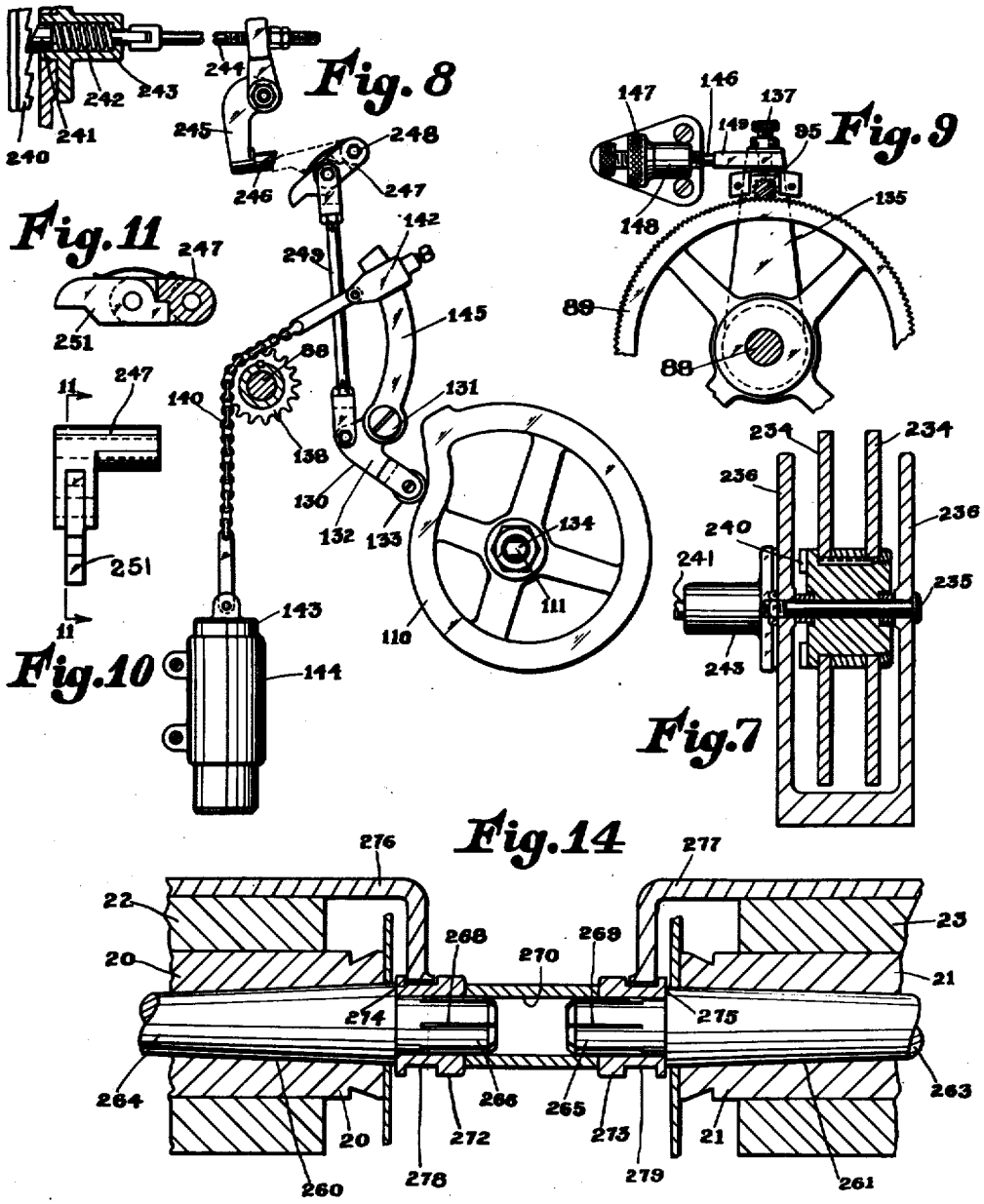

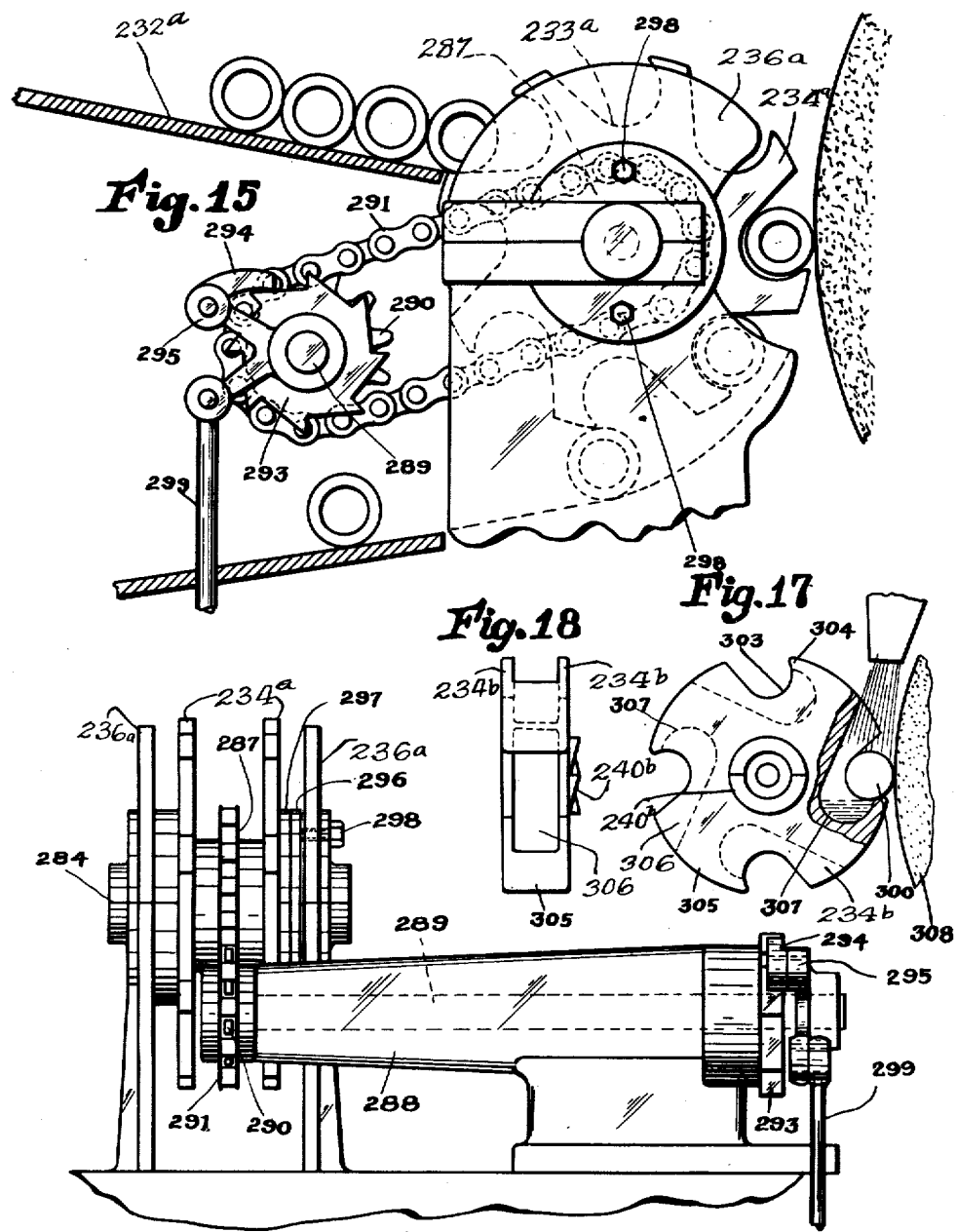

Patented Oct. 28, 1930

1,779,823

UNITED STATES PATENT OFFICE

CHARLES H. NORTON, OF PLAINVILLE, CONNECTICUT, ASSIGNOR TO NORTON COMPANY, OF WORCESTER, MASSACHUSETTS, A CORPORATION OF MASSACHUSETTS

AUTOMATIC CYLINDRICAL GRINDING MACHINE

Application filed September 28, 1925. Serial No. 59,158.

My invention relates to a grinding machine and more particularly to an automatic machine for grinding cylindrical objects.

The ordinary plain cylindrical grinding machine is too slow for rapid production of small cylindrical objects, since a large number of operations are required of the operator while the machine remains idle. In using such a machine, when a piece of work has been ground to size, it is necessary for the operator to stop the motion of the machine, turn the feed mechanism to remove the grinding wheel from the work, move the footstock center, and manually remove the piece of work from the centers. He then takes the next rough piece of work to be ground, which has previously been dogged, and inserts it in axial alignment between the centers. This being done, he brings the footstock center into position to support the work and starts the machine in motion, after which he must feed the wheel into the work and occasionally stop to caliper the work and make sure of getting it to size. It will be readily seen that considerable time is lost, by having to perform all these operations, and it is seldom that work is of such a size and character that an operator can run more than one of these machines at a time.

It is an object of my invention to overcome such difficulties and to increase production when a large number of duplicate pieces are to be ground by providing a machine which may be fully or partially automatic in operation and thereby require but little attention on the part of the operator.

A desirable type of automatic grinding machine is one which is so arranged that the work may be placed in a hopper by the operator and from there fed into axial alignment with automatically operated gripping members which support and rotate the work during the grinding operation. The pieces of work should be ground successively by feeding the grinding wheel with extreme precision through a predetermined distance and then withdrawing it for removal of the finished work and replacement by a fresh piece.

To feed the wheel into the work requires a mechanism which goes through a cycle of operations and which is capable of fine adjustments and will produce uniform and duplicate results repeatedly. The operator should be required merely to fill the magazine with rough pieces of work to be sized, and from time to time make slight adjustments to take care of any wear of the grinding wheel.

It is accordingly a further object of my invention to provide a wheel feeding mechanism which will operate automatically and repeatedly to feed the wheel accurately into the work to a predetermined position, so as to grind the work to an exact size, and then to remove the wheel and permit replacement of the work, and particularly to utilize the standard nut and screw cross feed mechanism for this purpose by providing a cam mechanism capable of turning the cross feed screw through the desired cyclic movement.

A further object is to provide a manual control for the cross feed which is so arranged that the wheel may be repeatedly and cyclically fed through a variable but predetermined distance so as to grind different sizes of work with a minimum of lost motion.

A further object is to combine with the feeding mechanism a stopping device which may be adjusted to insure stopping the grinding when the work has reached a predetermined size.

Another object is to provide such an automatic cross feed mechanism with a manually adjustable precision device which makes it feasible to set the grinding wheel in any desired position relative to the work, as well as to take up for wheel wear and to feed the wheel into the work manually or automatically as desired.

It is a still further object of my invention to provide an automatic grinding machine of this type, in which the grinding wheel is fed straight into the work by power operation of a cross feed screw, with a mechanism which reciprocates the grinding wheel axially and thereby eliminates grain markings showing on the work.

A further object is to provide a fully automatic grinding machine in which the work pieces are successively gripped by and released from work supporting members, and to provide mechanism coordinating such an operation with the wheel feeding movement, so that they will be carried on in a proper timed relation.

With these and other objects in view as will be apparent to one skilled in the art, my invention resides in the combination of parts set forth in the accompanying description and covered by the claims appended hereto.

I have illustrated in the drawings a machine including all of the various features of my invention so arranged as to operate automatically, but certain of these features may be incorporated, as desired, in a semiautomatic machine intended to be manually controlled for grinding a single piece of work at a time, and it is to be understood that such subcombinations fall within the scope of my invention.

Referring to the drawings in which like reference numerals indicate like parts:

Fig. 2 is an end elevation of my machine, with portions of the base similarly broken away;

Fig. 3 is an enlarged fragmentary view showing the spindle operating mechanism;

Fig. 4 is an enlarged end elevation of the parts shown in Fig. 3;

Fig. 5 is an enlarged fragmentary end view showing the magazine turret mechanism for feeding the work to its grinding position;

Fig. 6 is an enlarged rear view of the magazine turret mechanism;

Fig. 7 is an enlarged fragmentary sectional view taken approximately on the line 7—7 of Fig. 5;

Fig. 8 is an enlarged fragmentary view taken approximately on the line 8—8 of Fig. 2 showing the cam operated feed mechanism and the indexing mechanism for the work turret;

Fig. 9 is an enlarged fragmentary view taken approximately on the line 9—9 of Fig. 2 showing a portion of the feed mechanism and stop;

Fig. 10 is an enlarged detail view of the lever shown in Fig. 8 for tripping the ratchet pawl;

Fig. 11 is an enlarged sectional detail view taken approximately on the line 11—11 of Fig. 10;

Fig. 12 is a fragmentary section on the line 12—12 of Fig. 2;

Fig. 13 is an enlarged fragmentary detail view showing the adjustable mounting for the work spindle drive shaft to tension the driving chains;

Fig. 14 is an enlarged sectional view showing a modified type of work holder;

Fig. 15 is an enlarged fragmentary end view partly in section of a modified form of turret operating mechanism;

Fig. 16 is an enlarged fragmentary front elevation of the mechanism shown in Fig. 15;

Fig. 17 is a fragmentary end elevation partly broken away showing a modified form of work presenting mechanism; and Fig. 18 is a fragmentary rear elevation of the mechanism shown in Fig. 17.

Figure 1:
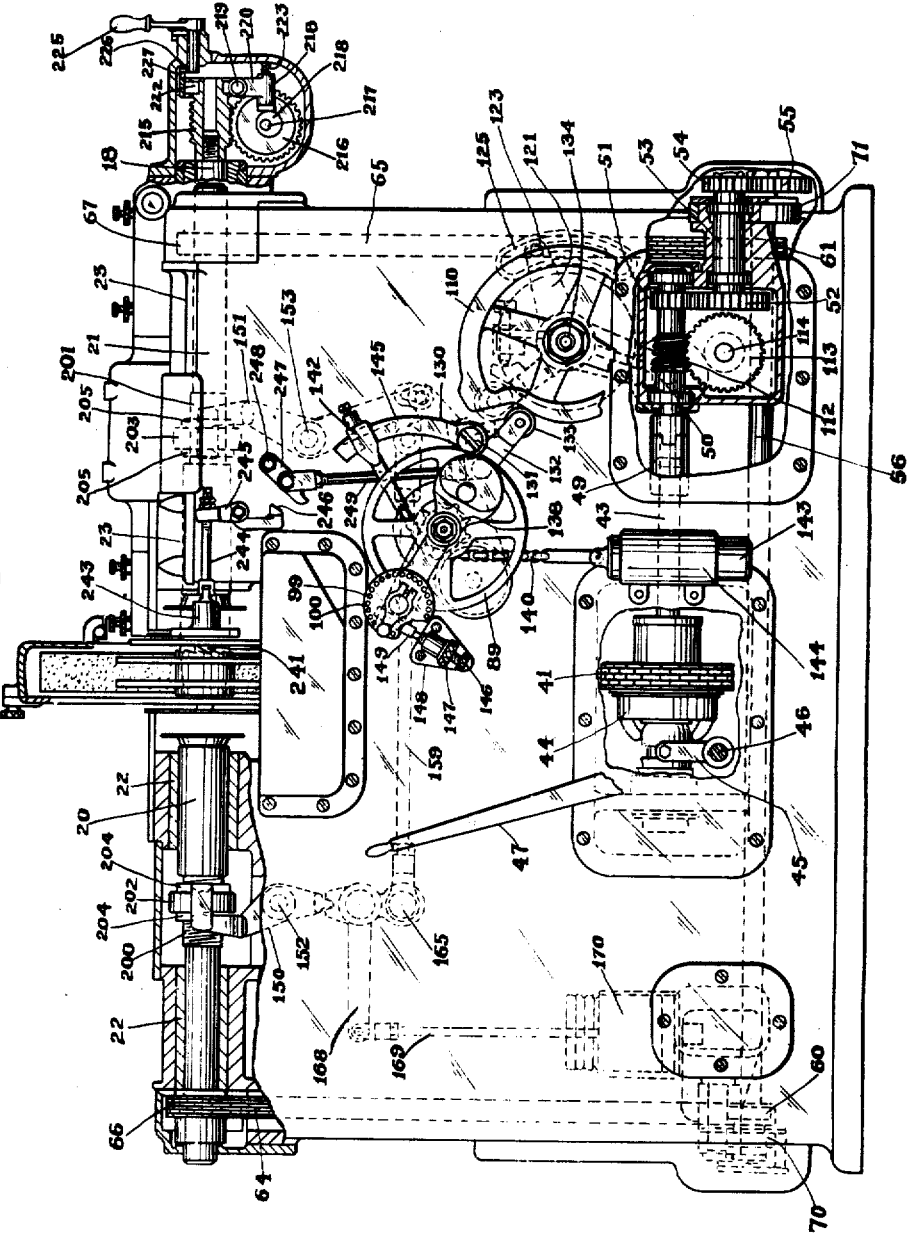
Figure 1 is a front elevation of my automatic grinding machine having portions broken away to more clearly show the inside mechanism.

In my preferred construction, I have illustrated an automatic grinding machine in which the work is placed in a hopper and is then fed automatically into axial alignment with a pair of rotatable work supporting spindles, which are arranged to move toward the ends of the work to grip it adjacent its periphery for rotating it by frictional contact. In order to feed the grinding wheel and the work relatively towards each other, one of these, and preferably the wheel, is mounted on a slide, and this slide is moved precisely by means of a cross feed screw mechanism. This is operated by a power drive which is preferably controlled by a cam so as to move in timed relation with the work supporting spindle mechanism. I prefer to feed the slide forward by an adjustable weight and to move it back positively by the cam mechanism, and I so arrange the parts that the grinding wheel is fed rapidly at the start and then with a slow and uniform feeding motion until the work has been reduced to its approximate size, at which point the feed mechanism engages a stop which prevents further feeding movement of the grinding wheel and permits the wheel to grind out or finish grind the work. The cam is preferably so shaped that when the work has been finished, it moves the slide rapidly in the opposite direction to remove the grinding wheel from the work. Likewise, the work gripping mechnism is preferably operated in one direction to grip the work by an adjustable weight and in the opposite direction by a power driven cam. The work may be fed to the work supports by hand or automatically, as by means of a turret wheel which is moved in timed relation with the spindles to present the work thereto and then remain stationary during the grinding operation. The turret may be moved positively by a power drive or the weight of the work may be utilized to rotate it, and a cam operated control device insures that the wheel remains immovable except when release of the finished work and feeding of a new piece is required. I also provide a wheel spindle reciprocating mechanism to oscillate or reciprocate the grinding wheel spindle axially through a short distance so that the wheel will wear evenly and prevent the formation of grain markings on the work being ground.

Referring to the drawings, I have there shown the machine base 10 as made in two parts, one the front base 11 and the other the rear base 12 (Figs. 1 and 2). The rear base 12 carries the usual grinding wheel slide 13 which is adapted to slide transversely on the usual V-way 14 and flat way 15 mating with corresponding ways on the base. The grinding wheel slide carries a grinding wheel spindle 18 which is mounted in suitable bearings in the wheel slide and carries on one end a grinding wheel 19, as clearly illustrated and described in my prior Patent No. 1,443,924.

A pair of rotatable axially slidable work supporting spindles 20 and 21 (Figs. 2 and 3) are journaled in the front base of the machine in two pairs of bearings 22 and 23 respectively, which may be of suitable construction. These spindles are preferably so arranged that they may be driven in synchronism with each other so as to produce a proper rotation of the work.

Power driving mechanism

As shown in Fig. 2, the rear base is provided with a main drive shaft 30, driven by any suitable source of power, which carries a pulley 32 to transmit power to the wheel spindle 18 by means of a belt 33 passing over a pulley 34 on the wheel spindle 18 and an idler belt tensioning pulley 35. Power may be transmitted to the front base of the machine from the main drive shaft 30 by a sprocket 40 thereon and a link drive chain 41 to the sprocket 42 on the shaft 43. The sprocket 42 is rotatably mounted on the shaft 43 and is so constructed that it may be connected or disconnected from the shaft by means of a suitably constructed clutch 44 which is operated by the usual yoked member 45 pivoted to the base at 46 and the manually operable lever 47. The shaft 43 is connected by a coupling 49 to the shaft 50 which carries a spur gear 51 meshing with a spur gear 52 on the short shaft 53. The shaft 53 carries on its other end a spur gear 54 meshing with a spur gear 55 on the cross shaft 56 which extends the length of the machine. This shaft 56 carries the sprockets 60 and 61 respectively which drive the link chains 64 and 65. These in turn drive the sprockets 66 and 67 on the work supporting spindles 20 and 21 respectively. The chains 64 and 65 are of sufficient length and have enough flexibility so that the sprockets 66 and 67 may be fixed to the axially slidable work spindles 20 and 21.

The gears 54 and 55 are preferably change gears and are so constructed that they may be readily removed and replaced by other combinations to vary the work rotating speed. These gears 54 and 55, as illustrated, are arranged to give a slow speed rotation of the work support spindles. By removing them and placing the larger gear 55 on the shaft 53 and the smaller gear 54 on the shaft 56 the speed of rotation of the work supporting spindles may be increased.

To permit tensioning the link drive chains 64 and 65, I preferably mount the shaft 56 in the two swinging brackets 70 and 71 (Fig. 13) which are arranged to swing about the axis of the shaft 53 as a pivot, so that for any position of the shaft 56, the gears 54 and 55 are always in mesh. The brackets 70 and 71 are each provided with an elongated slot 73 and a set screw 74 which passes through the elongated slot and is screw threaded into a portion of the base of the machine. It will thus be readily seen that the brackets 70 and 71 may be separately adjustable and locked in a desired position, so that either of the chains 64 and 65 may be tensioned without disturbing the driving tension of the other.

Cross feed mechanism

One of the main features of my invention has to do with obtaining a precise and duplicatable feeding movement of the wheel into the work. To this end, I mount one of these, and preferably the grinding wheel, on a cross slide and connect a feed screw thereto. This feed screw is rotated automatically by a power mechanism, and the rate of rotation and direction of movement is accurately controlled by a further automatic device, which is preferably a cam, so that the wheel is fed forward a predetermined amount and then withdrawn. Successive pieces of work may be brought to the same exact size by utilizing an adjustable stop so arranged that the feed screw may not be turned beyond a certain point, irrespective of the operation of the cam and power drive therefor. The power is best applied by means of an adjustable weight arranged to feed the wheel into the work as permitted by the cam, and the latter serves to withdraw the wheel and lift the weight for the next infeed operation.

A further important feature lies in a construction which permits one to vary the length of the feeding stroke without changing the cam. This is simply accomplished by connecting the cam with the screw by means of a chain passing over a sprocket on the screw shaft and adjustably connected to an involute shaped lever which is oscillated by the cam. The point of connection of the chain with the lever may be adjusted to change the effective length of the lever arm, and this serves merely to wrap the chain about the sprocket without turning the screw.

While the slide may be moved by various types of cross feed mechanism, I prefer to employ one which is patterned generally after that shown in my prior Patents No. 762,838 and No. 1,443,924. This mechanism comprises a half-nut 80 secured to the under side of the wheel slide 13 which is screw threaded to engage a plurality of corresponding threads on a feed screw 81. The feed screw is journalled in the rear base of the machine and carries on its front end a gear 83 meshing with a pinion 84 on the shaft 85 journalled in the front base of the machine. The shaft 85 carries a gear 86 meshing with a gear 87 on the shaft 88, on which is mounted the gear wheel 89 arranged to turn the feed screw. The hand feed lever 92 is rotatably mounted on a projection of the shaft 88 and carries a micrometer adjusting mechanism 93, such as is clearly described in my prior Patent No. 762,838 and the patent to Wilcox No. 1,261,083. This mechanism permits adjusting the feed arm 94 relative to the gear wheel 89, and comprises a pinion 95 meshing with the gear 89 and a crank arm 96 adjustably clamped to the extension 97 of the pinion shaft 95. By pulling the plunger 98 from the opening 99 in the index plate 100, the crank arm 96 may be turned the desired amount to adjust the arm 94 relative to the gear wheel 89. When in adjusted position the plunger 98 may be reinserted in the nearest opening 99 in the index plate 100. This makes it possible to position the grinding wheel as desired relative to the work, to adjust for wheel wear, or even to feed the wheel by hand when considered necessary.

*Cam controlled power drive for feed screw*

The feed screw is rotated by a cam mechanism, including a cam and a follower operatively connected to the feed screw, which is so constructed and arranged that the distance and rate of travel of the wheel into and away from the work are predetermined in accordance with the contour shape of the cam. The embodiment illustrated comprises an adjustable weight connected to the screw by a chain and sprocket, and the movement of the weight is controlled by a power driven cam. To this end, I may mount a cam 110 on the shaft 111 which is journalled in the front base of the machine. To positively rotate the cam 110, a worm 112 is mounted on the shaft 50 (Fig. 1) in mesh with a worm gear 113 mounted on the shaft 114. The other end of the shaft 114 carries a gear 115 (Figs. 2, 3 and 4) which in turn meshes with an intermediate gear 116, arranged to drive a gear 117 on the cam shaft 111 to rotate the cam 110.

To permit varying the speed of rotation of the cam and consequently the speed at which the grinding wheel is fed inwardly, I employ a suitable change gear mechanism. This may be simply accomplished by mounting the gear 116 on a swinging arm 120, which swings about the axis of the cam shaft 111 as a pivot. The small gear 115 is preferably a change gear which is so constructed that it may readily be slipped into place or taken off and changed for a larger or smaller gear. The arm 120 is preferably a bell crank, having a projecting arm 121 by which the gear 116 may be swung into mesh with the change gear 115. The gear 116 is locked in its adjusted position by a clamping screw 123, which slides within the arcuate slot 124 in the member 125. This member 125 is fixed inside the machine by the threaded studs 126 (Fig. 2).

To transmit the motion of the cam 110 so as to control the movement of the feed mechanism, I mount a lever 130 (Figs. 1, 8 and 12) on a pivot 131 on the base of the machine. The short arm 132 of the lever 130 carries a follower roller 133 which is adapted to engage the operative surface of the cam 110. A radially extending arm 135 having a projecting hub 136 is journalled on the shaft 88 and is provided at its outer end with a locking screw 137 adapted to lock the arm 135 to a projection of the arm 94. The member 135 carries a sprocket 138 on its projecting hub 136. To transmit the cam motion from the lever 130 to the feed mechanism, I employ a link chain 140 which passes over the sprocket 138 and has one end adjustably connected to the arm 145 by a slidable clamping member 142. The lower end of the chain 140 is connected to a weight 143 which is slidably mounted in the housing or bracket 144 secured to the base of the machine. The weight 143 is of sufficient size to turn the feed screw to feed the grinding wheel into the work and to keep the cam follower roller 133 always in contact with the surface of the cam 110.

The feed cam 110 is preferably of such a shape that it will cause the grinding wheel to be fed rapidly toward the work for a short period of time until it is about to contact with the work, and thereafter be moved at a slow and uniform rate until the work has been reduced to its approximate size. During the final stage of grinding the feed mechanism is held immovable by a stop mechanism for a short period of time to permit the grinding wheel to finish the grinding operation.

From this disclosure, it will be readily seen that the weight 143 turns the feed screw as limited by the shape and motion of the cam 110 to produce the feeding action of the grinding wheel toward the work. The return motion of the grinding wheel caused by the abrupt rise on the cam positively turns the feed screw in the opposite direction against the action of the weight 143, and moves the grinding wheel rearwardly to its initial position.

*Feed stop device*

To positively limit the infeed of the grinding wheel at a predetermined point, I provide a stop screw 146 adjustably held in position by a locking nut 147 in a bracket 148 fixed to the front of the machine base (Figs. 1, 9 and 12). The bracket 148 is so shaped and positioned on the base that the screw 146 is in the path of the outer abutment 149 of arm 135. The stop screw 146 is preferably so adjusted that the arm 135 contacts with the screw 146 before the cam follower roller 133 reaches the end of the infeed portion of the cam. With this adjustment, it will be readily seen that the stop screw 146 positively limits the feeding movement of the grinding wheel at a predetermined point, since the cam mechanism acts, not directly upon a massive wheel slide, but upon the feed screw, and it is possible to turn the latter with a fine degree of precision and therefore feed the grinding wheel exactly to a predetermined position and reduce pieces of work to a desired size successively and uniformly. Moreover, when the stop becomes effective, the feed control cam may continue to rotate but the stop holds the cam follower out of contact with the cam until it is time to move the wheel away from the work; hence, the stop acts positively to limit the infeed of the grinding wheel.

*Adjustment of feeding stroke*

The feeding motion of the cam is limited by the size and shape of the cam. In order that the amount of feeding movement per cycle may be varied, I preferably make the upper arm of lever 130 as an involute shaped arm 145. By shifting the position of the slidable clamping member 142, which is secured to the end of the link chain, along the arm 145, I change the effective length of the lever arm 145 and consequently vary the amount of feeding movement. The nearer the clamping member 142 is to the pivot point 131, the less the feeding movement. The greater the distance away the clamping member 142 is from pivot 131, the greater the distance through which the mechanism will feed the wheel into the work. By making the lever 145 in the shape of an involute of a circle, the clamp 142 may be adjusted along the lever without changing the relative position of the link chain and therefore without disturbing the position of the feed screw, since the chain merely wraps itself around the sprocket 138 and does not turn the screw when such adjustment is made.

In setting up the feed mechanism for any particular piece of work to be ground, the clutch 44 is thrown out of engagement and the work is mounted on the work supporting spindles. The locking screw 137 is then disconnected from the projection of the feed arm 94 so that the radially extending arm 135 swings downwardly into contact with the stop screw 146. The feed mechanism is now free so that the grinding wheel may be fed manually into the work.

The feed cam 110 is then rotated by manually turning the shaft 111 by placing a wrench on the projection 134 until the follower roller 133 is a short distance from the abrupt rise in the cam. The feed mechanism is then turned by means of the hand lever 92 until the grinding wheel reaches a position where the work has been reduced to its desired size. By withdrawing the micrometer adjusting plunger and turning the pinion relative to the feed gear, the feed arm 94 swings into substantial alignment with the arm 135 so that the locking screw 137 may be screwed into place and lock the feed mechanism to the arm 135. It may be necessary at this point to adjust the micrometer device slightly to bring the arm 135 into contact with the stop screw 146. It also may be necessary to make a slight adjustment of the stop screw 146 to be sure that the cam follower roller 133 does not touch the operative surface of the cam for a short distance before the abrupt rise is reached. If this adjustment is necessary, the operator will also have to make a further readjustment of the micrometer device to bring the work to the desired size.

In view of the above explanation, it will be understood that the feed screw is rotated in opposite directions through a definite distance and at a predetermined rate controlled by the contour shape and rate of movement of a cam, so that the grinding wheel moves cyclically and repeatedly through the same path of advance and retreat, or what may be termed "an invariable cam cycle". The distance through which the wheel moves is therefore a function of the extent of a single rise and fall of the follower on the cam, and this may be varied by making adjustments of the stop and of the location of member 142 on the arm 145. These adjustments make it possible to regulate the rate of feed, as well as the distance of travel of the wheel, so that the grinding operation may be controlled as desired. It will also be understood that the adjustable stop makes it possible to grind with even greater precision of measurement than can be obtained by the use of the cam alone, since the stop may be set to stop the infeed of the wheel before the cam follower has reached the extent of its throw, i. e. the lowest point on the cam, and thereby prevent further infeed of the wheel and permit the grinding operation to die out gradually and so produce a fine finish on the work.

*Work gripping and supporting mechanism*

Another important feature of the invention is the provision of a power operated mechanism for gripping and centering the work and thereafter rotating it for the grinding operation. This may be accomplished by means of a yielding device which is preferably weight operated to close the gripping members on the work, and a power operated positively acting mechanism to release the work, which parts move in timed relation with the wheel feed mechanism.

I have found that such a work gripping and rotating device, to be effective, must engage the work close to the periphery thereof, so that the torque and the friction of the rotating members may be as high as possible, as compared with the retarding effect of the grinding wheel on the work. If the work is gripped only near its center line, there is a serious possibility of slippage and consequent imperfect grinding. My device is so arranged that it automatically centers the work, and it is not necessary to first provide the work with center punch markings or to make other provisions for this purpose. The particular type of work gripper used depends upon the shape of the work to be ground. In some cases, I employ members which engage only the ends of the work. If the work is hollow, I may utilize spring fingers fitting within the work to assist in supporting it.

In my preferred construction, shown in detail in Figs. 3 and 4, I provide a simple arrangement for moving the work gripping members which is operated by a cam controlled weight and linkage mechanism. As shown, the spindles 20 and 21 are axially movable and carry work gripping members at their inner ends which are forced into contact with the work and are rotated by the spindles. These spindles are moved axially by levers 150 and 151 pivoted to the base at 152 and 153 respectively. The upper ends of these levers are each provided with yoked portions 154 and 155 which are connected to move the spindles, which carry the work gripping members, axially towards and from the ends of the work. The lever 151 is shaped like a bell crank and has a downwardly extending portion 157 connected by the pivot pin 158 to the connecting rod 159. To move the two levers simultaneously in opposite directions, I provide the lower end of the lever 150 with a gear tooth projection 162, meshing with the teeth or projections 163 on the substantially T-shaped lever 164. The lower arm of the T-shaped lever 164 is connected by the pivot pin 165 to the connecting rod 159. The long arm 168 of the T-shaped lever 164 supports through the rod 169 an adjustable weight 170. This mechanism, as clearly shown in Figs. 1, 3 and 4, is such that the weight normally acts to hold the work supporting members towards each other to grip the opposite ends of the work piece with an equalized pressure.

To separate the work supporting spindles 20 and 21 and thereby release the finished work and permit a new piece to be put into position for grinding, I provide an adjustable, positively actuated intermittent mechanism operating in timed relation with the wheel feeding mechanism. To this end, I provide a revoluble member arranged to strike the lower end of one of the spindle actuating levers and force it to move the grippers outwardly. As illustrated, I employ a roller 180 carried by the adjustable arm 181 rotatably mounted on the cam shaft 111. A projecting arm 182 is mounted in fixed position on the cam shaft 111 and provided at its outer end with an adjusting screw 183 and lock nut 184. The outer end of the adjusting screw 183 bears against the projection 186 of the lever 181 so that the roller 180 carried by the arm 181 may be adjusted angularly relative to the operative face of the cam 110. This insures operating the work supporting spindles in timed relation with the movement of the grinding wheel slide. Depending from the pivot 158 on the bell crank 157 is an adjustable arm 187 carrying a pin or projection 188 so constructed and positioned that it is in the path of the roller 180. As the cam shaft 111 rotates, the adjusting screw 183 carries the roller arm 181 and the roller 180 about its axis. The roller 180 contacts with the pin or projection 188 and swings the linkage mechanism towards the left, thus moving the arm 150 and 151 outwardly to separate the work gripping members on the supporting spindles. This construction provides means for yieldingly moving the spindles towards each other, so as to make the machine safe in its operation, and insures a positive separation of the spindles when the work has been finished.

*Adjustments for work supports*

To vary the amount of movement of the work supporting spindles, I preferably mount the arm 187 so that it pivots about the pin 158. A projection 190 on the arm 187 is provided with an elongated slot 191 so arranged that the arm 187 may be locked in adjusted position to the lever 157 by a nut and screw 192 which passes through the slot 191. By swinging the arm 187 towards the right, one reduces the amount of motion transmitted to the work supporting spindles because the roller 180 will strike the pin 188 only at the upper portion of the roller and so contact therewith later and leave it sooner than would be the case if the pin 188 were lowered to be struck by the roller near a horizontal diameter. As shown in the drawings, the arm 187 is adjusted to the extreme left hand position to give a maximum relative movement to the work supporting spindles.

To vary the distance between the work supporting spindles, I provide the spindles 20 and 21 with threaded portions 200 and 201. Surrounding these threaded portions are a pair of double race ball bearings 202 and 203 which engage the yoked portions 154 and 155 of levers 150 and 151 respectively. To adjust the positions of the ball bearings relative to the spindles, I provide a pair of nuts 204 and 205 so arranged that the ball bearings may be moved along the threaded portions 200 and 201 and then locked in position. This adjustment varies the distance between the work engaging members on the spindles to accommodate different lengths of work.

As a further means of varying the distance between the work supporting spindles to accommodate various lengths of work, I make the connecting rod or link 159 adjustable in length. This is preferably accomplished by means of a turnbuckle or other suitable arrangement. As shown, I may screw thread each end of the rod 159 and mount the threaded couplings 206 and 207 thereon. Lock nuts 208 and 209 are provided respectively to lock the couplings in adjusted positions. After removing the pivot pin 165 from the pivotally mounted coupling 206 and loosening the lock nut 208, the operator may turn the coupling 206 relative to the rod 159 to shorten or lengthen the distance between pivots 165 and 158 and thus vary the distance between the ends of the work supporting spindles. Likewise the other pivot pin 158 may be removed and the coupling 207 adjusted if a further adjustment is necessary.

To prevent a rapid dropping of the weight 170 and consequently a too sudden motion of the spindles 20 and 21 in gripping a new piece of work, I preferably mount the weight 170 so that its lower portion acts as a dashpot piston (see Fig. 3). The piston or weight 170 is surrounded by a dash-pot cylinder 210 which is provided with an opening to the atmosphere controlled by an adjustable air valve 211 so arranged that the leakage of air may be regulated to cushion the motion of the weight. By varying the weight 170 and the adjustment air valve 211, the spindles may be moved slowly or rapidly towards each other and held in frictional contact with the ends of the work to be ground with sufficient pressure to support and rotate the work during the grinding operation.

The bottom of the dash-pot cylinder 210 is provided with a series of openings or holes 212 to allow air to leak rapidly into the cylinder on the up stroke of the piston or weight 170 and prevent retarding the releasing movement of the work supporting spindles. To prevent air escaping from the cylinder through the holes 212 during the downward motion of the piston, I place a soft, flexible disk 213 of leather, rubber or the like in the bottom portion of the cylinder. The disk 213 acts as a valve and prevents the escape of air on the downward movement of the piston, but permits air to readily raise the disk and enter the cylinder on the upward movement of the piston.

Wheel spindle reciprocating mechanism

In grinding work of the class adapted for an automatic grinding machine, a wide faced wheel is employed. A direct infeed of the wheel is used and the wheel is preferably of sufficient width to cover the length of the article being ground. To prevent uneven wearing of the grinding wheel face and to eliminate grain markings on the work, I preferably provide a relative oscillating or reciprocating movement between the grinding wheel and the work. In my preferred construction, I have illustrated a reciprocating mechanism which moves the grinding wheel spindle axially by means of the rotative power of the wheel spindle. As shown in Fig. 1, the wheel spindle 18 is provided with a worm 215 attached to its outer end. The worm 215 meshes with a worm gear 216 mounted on the shaft 217 which also carries the eccentric or cam 218. On a parallel stud or shaft 219, I mount a yoked member 220 having a depending follower arm 221 adapted to contact with the operative face of the cam or eccentric 218. The upper end of the yoked member is provided with a pair of rollers which are adapted to ride in an annular groove 222 on the end of the worm 215 so that any motion of the eccentric or cam is transmitted through the pivotally mounted yoked member to move the grinding wheel spindle axially. A spring 223 engages the yoked member 222 to hold the follower arm normally in operative contact with the eccentric or cam.

In grinding certain classes of work, such as work having a shoulder, it is sometimes essential that the grinding wheel be fed into the work without axial reciprocation of the wheel spindle. To this end, a manually operable lever 225 is pivoted to the housing of the oscillating mechanism and provided at its inner end with a projection having a cam face 226 which acts upon a corresponding cam projection 227 on the yoked member 220 to hold the yoked member out of engagement with the surface of the eccentric 218 and prevent axial movement of the grinding wheel spindle.

Work feeding mechanism

To make the grinding machine fully automatic, I provide means for feeding the work automatically into grinding position on the machine. As illustrated in Figs. 5, 6 and 7, my preferred form of magazine feeding device comprises a turret wheel 230 having openings in its periphery to receive the pieces of work from the hopper 231. The operator places the new pieces of work in the hopper 231 and they roll down the surface 232 and into pockets 233 formed in the two disks 234 which make up the turret wheel 230. This wheel is suitably mounted to rotate about an axle 235 carried on uprights 236 supported on the machine base. A projecting lug 237 is mounted on the inside surfaces of each upright 236 to prevent the new piece of work 238 dropping into pocket 233 in the turret while grinding is going on, and at the same time keeping two pieces from getting into the pocket at once. When the turret wheel rotates, the piece supported on the shelf formed by lugs 237 is forced into the adjacent pocket, and another piece of work rolls onto the shelf in the next pocket as it comes into position.

The turret wheel 230 may be rotated to present new pieces of work to the work supporting spindles by any desired means, but in my preferred construction, I utilize the influence of gravity to turn it and employ a cam operated mechanism to release the turret when the spindle gripping members have dropped the finished piece of work, and permit it to turn just enough to present the next piece to the work supports. To this end, I provide the side of the turret wheel 230 with a ratchet wheel 240. A ratchet pawl 241 is slidably mounted in the boss 243 which is fixed to the upright 236. The ratchet pawl is held by spring pressure in engagement with the teeth of the ratchet wheel 240 to prevent rotation of the turret wheel in a direction to feed the work. To release the pawl 241 from the ratchet wheel 240 and permit the influence of gravity to act on the new pieces of work to turn the turret wheel, I preferably connect the ratchet pawl to the connecting rod 244 (Fig. 8), the other end of which is adjustably connected to the lever 245 pivotally mounted on the side of the base. The lower end of the lever 245 is provided with a cam face 246 adapted to be engaged by a second lever 247 pivoted to the base by a cap screw 248. The lever 247 is connected by means of a connecting link 249 to a projecting portion of the follower lever 132 so that motion of the cam follower 133 due to the abrupt rise portion of the cam is transmitted to raise the lever 247 and cause it to swing and contact with the cam portion 246 and thereby move the lever 245 to withdraw the pawl 241 from engagement with the ratchet wheel 240. This permits the force of gravity acting upon the new pieces of work in the turret wheel 230 to turn the wheel rapidly to bring the next piece of work into axial alignment with the work supporting spindle.

To keep the turret wheel 230 from rotating too far and permit it to rotate just sufficiently to bring the next piece of work into axial alignment with the work supporting spindles, I provide the ratchet wheel 240 with the same number of ratchet teeth as there are work openings in the turret wheel 230. A reduced portion of the ratchet pawl 241 within the projection 243 is surrounded by the spring 242 which exerts a sufficient pressure to hold the pawl in position in contact with the ratchet wheel. The cam face 246 of the lever 245 is so shaped that the ratchet pawl may return rapidly into contact with the next ratchet tooth under the influence of the spring 242 as soon as the lever 247 passes over the cam face 216. This movement is sufficiently rapid so that the pawl catches in the notch next to the one from which it has just been released, and so stops the wheel when the next work piece is opposite the spindles.

In order that the lever 247 may ride downwardly over the cam face 246 without removing the pawl from the ratchet wheel, I preferably make the lever 247 (see Figs. 8, 10 and 11) in two parts. As shown in Fig. 11, the outer swinging portion 251 is pivotally mounted to the lever 247 and is so shaped that on the upward movement, the lever 247 and portion 251 act as a single lever. On the downward movement, however, the portion 251 contacts with cam face 246 and swings upwardly so that it may pass by the cam face 246 without moving the ratchet pawl. When released from the supporting spindles, the piece of work that has been ground falls slightly into contact with its pocket and remains there to aid in turning the wheel to bring the successive pieces of work into their proper grinding positions. As shown in Fig. 5, the piece of work remains in the wheel until it is free to roll downwardly into a container 250 on the front base of the machine.

To position the pieces of work axially, I provide one of the uprights 236 with a spring 252 which projects so as to press against one end of the piece of work and force it to the right, as shown in Fig. 6, against the opposite upright or support 236 of the wheel 230 so that each piece of work is presented to the spindle in the same relative position. This spring 252 is preferably provided with an adjusting screw 254 threaded into the support 236 so that the tension of the spring may be adjusted.

*Work supporting devices*

Of the various forms of work gripping and supporting devices which I may employ, I have illustrated two types (see Figs. 3 and 14) which are adapted for holding solid and hollow pieces respectively. In the form shown in Fig. 3, I utilize the cup centers 255 and 256 which are so shaped that they contact with the ends of the work 257 only adjacent the periphery of the work to center and drive the same. The weight 170 and linkage mechanism which are connected to move the work gripping members 255 and 256 axially are so adjusted that the weight holds these members against the work with sufficient pressure to rotate and center the work during the grinding operation.

The device shown in Fig. 14 is particularly useful where it is desired to grind the outer cylindrical surface of a work piece concentric with an internal cylindrical surface. In this case, the spindles 20 and 21 are each provided with tapered apertures 260 and 261 respectively to receive the correspondingly tapered members 263 and 264. The outer ends of the members 263 and 264 are provided with the reduced portions 265 and 266 respectively which are adapted to center the work by its central opening. The portions 265 and 266 are preferably constructed with spring fingers formed by cutting radially extending slots 268 and 269 in the reduced end portions, these serving to center the work even though there are slight variations in the diameter of the holes or openings 270 in the work. The work is gripped between two collars 272 and 273 which are slidably mounted on the spring finger ends 265 and 266. The outward movement of these collars is limited by the shoulders 274 and 275 on the tapered spindle members 263 and 264. The inner ends of the collars are adapted to frictionally engage the ends of the work with sufficient pressure to rotate the work during the grinding operation.

To permit the spindles to withdraw from the finished work, I employ shedder members 276 and 277 mounted on the work supporting spindle housings on the front base of the machine. These shedder members extend downwardly and serve as yoke arms which engage the annular grooves 278 and 279 in the slidable members 272 and 273. When the spindles 20 and 21 are withdrawn to release a finished piece of work, the slidable members 272 and 273 are held against axial movement by the yoke members 276 and 277. This permits the portions 265 and 266 to slide within the members 272 and 273 and withdraw from their supporting position in the opening 270. As the spindles 20 and 21 withdraw, the shedder members hold the slidable members 272 and 273 against endwise movement so that the work supporting spindles 20 and 21 may withdraw from their gripping positions against the ends of the work. This permits the turret wheel to be rotated to bring the new piece of work into axial alignment with the work supporting spindles.

*Power driven turret wheel*

It may be desirable in grinding some kinds of work to provide a turret wheel which is positively rotated to bring the new pieces of work successively into axial alignment with the work supporting spindles. To accomplish this, I may provide a mechanism which will operate intermittently to positively rotate the turret wheel to bring the work into grinding position. As shown in the drawings, such a construction comprises a turret wheel composed of the disks 234ª and 234ª having pockets 233ª to receive the pieces of work as they roll down the surface 232ª of a hopper. The turret wheel is mounted for rotation on a shaft or stud 284 supported in the uprights 236ª and 236ª mounted on the machine base. A sprocket 287 is fixed on the wheel hub in the space between the disks 234ª and 234ª. A supporting bracket 288 is mounted on the machine base and has a shaft 289 journalled therein which carries a sprocket 290 on its outer end connected by a link chain 291 with the sprocket 287 to rotate the turret wheel.

To cause the shaft 289 to turn the turret wheel at a proper time, I may connect this shaft with the wheel feed mechanism so that the work will be fed in timed relation with the movement of the grinding wheel. To accomplish this, I mount a ratchet wheel 293 on the other end of the shaft 289 and provide a ratchet pawl 294 on the bracket 295 which swings about the axis of the shaft 289 to pick up the successive teeth of the ratchet wheel 293. To actuate the pawl, I provide a connecting rod 299 which is connected to the lever 130 so that as the feed cam 110 turns the lever 130 is moved to revolve the turret wheel and bring successive pieces of work into grinding position. To prevent excessive rotation of the turret wheel which would carry the new piece of work past the grinding position, I may employ a friction device, which, as illustrated, comprises a friction collar or washer 296 held in frictional contact with the projection 297 of the turret wheel to retard the rotation thereof. I provide adjusting screws 298 which are screw threaded into the uprights 286 and bear against the outer face of the collar 296 to vary the frictional contact between the washer 296 and the projection 297. By tightening or loosening the screws 298 the friction between the collar and the turret wheel may be varied as desired.

A further modification of a turret wheel is shown in Figs. 17 and 18, in accordance with which I utilize the weight and force of the water stream, which is used to cool the work during the grinding operation, in order to aid in turning the wheel. The wheel is essentially the same as that shown in Figs. 5 and 6 and is operated by means of the cam controlled mechanism shown particularly in Fig. 8; but it is provided with pockets, and shaped somewhat like a water wheel, so that water may enter the pockets on the descending side nearest the grinding wheel and escape only when the pockets successively reach the bottom of their circular path of revolution. As illustrated, the work pieces 300 are supported on the sides 234ᵇ and 234ᵇ of the wheel, recesses 303 being cut therein to form projecting lugs 304 which curve in such a manner as to hold the work in place. The peripheral portion 305 of the wheel which connects the sides is cut away to form spaced openings 306 and a set of curved walls 307 are formed, as shown in Fig. 17, in such a manner as to provide deep pockets to hold liquid. The sides 234ᵇ and 234ᵇ form the ends of the pockets and prevent the escape of liquid therefrom until the work has passed below the grinding wheel 308 and is to be discharged. The ratchet 240ᵇ corresponds with the ratchet 240 shown in Figs. 5 and 8, and it is by means of this ratchet control mechanism that the rotative movement of the wheel is regulated. The stream of water, diagrammatically illustrated as issuing from the pipe 310 which is normally used in a machine of this type, strikes against the adjacent openings of the pockets to the wheel, and fills the pockets, and the weight of the water, in addition to the weight of the work, serves to give the wheel a quick rotary movement when the ratchet is released.

The operation of the various mechanisms of the machine is apparent from the above description. In this machine, which is fully automatic in operation, the work is placed in the hopper 231 from which it rolls into successive pockets in the turret wheel 230. This wheel is rotated in timed relation with the other machine parts to carry the piece of work into substantial alignment with the work supporting members 255 and 256. At this point, the spindles 20 and 21 carrying the work supporting members are moved axially toward each other to grip the work and raise it slightly from the turret to support and rotate the work during the grinding operation. This is accomplished by means of the weight 170 which moves at a rate determined by the valve adjustment of the dash-pot 210. The motion of the weight is transmitted simultaneously to the two spindles by the linkage mechanism shown in Fig. 3.

The cam controlling mechanism shown in Figs. 1, 2, 8 and 12 is constantly rotating, so that when the cam roller 133 has passed over the sharp rise in the cam 110, the cross feed screw 81 will then be rotated by the weight 143 in such a direction as to feed the grinding wheel into the work. This goes on until the arm 135 which rotates with the feed screw strikes the adjustable stop screw 146. For a short time thereafter, the roller 133 is held out of contact with the cam while the grinding wheel finish grinds the work. During this interval the cross feed mechanism is stationary.

Then the cam roller 133 starts up the steep rise of the cam 110 and moves the grinding wheel back rapidly against the pull of the weight 143. When the wheel is out of contact with the work, the roller 180 which is revolved by the cam shaft 111 then strikes the projecting member 188 on the spindle operating mechanism and thereby forces the spindles to separate and withdraw the work supporting members from engagement with the ends of the work. The work then drops into its former position on the turret wheel, and a ratchet mechanism (see Fig. 8) operating in timed relation with the wheel cross feed mechanism is moved to release the turret wheel and permit it to revolve under the influence of gravity and bring the next piece of work into substantial alignment with the work supporting members, and the cycle of operations is then repeated.

Having thus described my invention, what I claim as new and desire to secure by Letters Patent is:

1. A grinding machine comprising a work support and a grinding wheel and means for imparting a cycle of motion comprising a feeding and withdrawing of one toward and from the other including a cam which times and controls such feeding and withdrawal and a follower engaging said cam and operating to cause a rotation between a screw and a nut by which the feeding movement is caused, or varied according to the varying radius of the cam.

2. A cylindrical grinding machine comprising a base, a rotatable grinding wheel and a work support thereon which are movable and relatively towards and from each other, a cross feed screw and a nut contacting through a plurality of threads which are connected to cause such movement, and mechanism, including a movable cam of special contour and a follower, operatively connected to rotate the screw and nut relatively in opposite directions in a cycle timed by the cam and feed the wheel into the work through a predetermined distance and at a rate which is determined by the contour and the speed of said cam.

3. A grinding machine comprising a base, a rotatable grinding wheel and a work support thereon which are movable relatively towards and from each other, a cross feed screw and a nut contacting through a plurality of threads which are connected to cause such movement, a power operated cam mechanism, including a rotatable cam of special contour and a follower, operatively connected to turn the screw and nut relatively in opposite directions in a cycle timed by the cam and thereby feed the wheel through a predetermined distance into and away from the work, the feeding movement being at a rate which is determined by the contour and speed of movement of the cam.

4. A grinding machine comprising a base, a rotatable grinding wheel and a work support thereon which are movable relatively towards and from each other, a cross feed screw and a nut which are connected to cause said movement, a cam mechanism, including a cam of special contour and a follower, operatively connected to rotate the screw and nut relatively in opposite directions in a cycle timed by the cam and feed the wheel directly into and away from the work, and an adjustable stop arranged to limit the forward feed of the wheel into the work at a predetermined position irrespective of the movement of the cam.

5. A cylindrical grinding machine comprising a base, a work support thereon, a grinding wheel mounted to move towards and from the work, a cross feed screw and a nut connected to move the wheel, power driven cam mechanism, including a rotary cam and a follower, connected to move the screw in a cycle timed by the cam and thereby feed the wheel into the work, and an adjustable stop arranged to limit the forward feed of the grinding wheel into the work at a predetermined position irrespective of the movement of the cam.

6. A grinding machine comprising a base, a rotatable grinding wheel and a work support thereon which are movable relatively towards and from each other, a cross feed screw and a nut connected therewith to cause such movement, mechanism, including a cam and a follower connected to rotate said feed screw and nut relatively in opposite directions in a cycle timed by the cam and thereby move the screw through a predetermined angular distance, and means associated therewith for varying the angular distance through which said screw and nut are relatively turned.

7. A grinding machine comprising a base, a rotatable grinding wheel and a work support thereon which are movable relatively towards and from each other, a cross feed screw and a nut connected therewith to cause such movement, mechanism including a rotatable cam and connections between said cam and the cross feed screw, arranged to move the screw in a cycle timed by the cam to feed the wheel into the work, and means for adjusting the length of feeding stroke of the screw caused by said cam mechanism without changing the position of the grinding wheel relative to the work.

8. A cylindrical grinding machine comprising a base, a work support thereon, a grinding wheel movable towards and from the work, mechanism, including a rotatable cam and a follower, operatively connected to feed the wheel continuously into the work and away therefrom in a cycle timed by the cam, means to vary the length of stroke of the wheel feeding movement caused by the cam and follower acting through a full stroke, and means including an adjustable stop to stop the wheel at any desired position relative to the work before the cam follower has reached the extent of its throw.

9. A cylindrical grinding machine comprising a base, a work support and a grinding wheel movable relatively towards and from each other, a cross feed screw and a nut connected to cause such movement, mechanism, including a cam and a follower, connected to rotate the screw and nut relatively in both directions in a cycle timed by the cam and feed the wheel into the work, means to vary the length of feeding stroke and an adjustable stop effective to stop the wheel relative to the work at a predetermined point.

10. A grinding machine comprising a base, a grinding wheel slide mounted thereon, a grinding wheel rotatably mounted on the slide, means to support the work in rotative and operative contact with the grinding wheel, power operated mechanism, including a rotatable cam and a follower, to feed the wheel slide toward and from the work in a cycle timed by the cam, manually adjustable means to vary the length of feeding stroke caused by the cam and follower acting through a full stroke, mechanism and a manually adjustable precision mechanism to position the grinding wheel as desired relative to the work.

11. An automatic grinding machine comprising a base, a slide, a rotatable grinding wheel thereon, a work support to position the work in rotative contact with the wheel, a nut and screw mechanism to move the slide and feed the wheel into the work, a power driven mechanism, including a cam and a follower, to turn said screw in both directions in a cycle timed by the cam, a micrometer device connected with said feed screw to adjust the distance between the wheel and the work and an adjustable stop cooperating with said device to positively limit the feeding movement of the wheel into the work irrespective of the cam movement.

12. An automatic grinding machine comprising a base, a grinding wheel rotatably mounted thereon, means to support the work in rotative contact with the grinding wheel, a cross feed screw and nut cooperating to move the grinding wheel and work relatively toward each other, a power driven mechanism, including a cam and a follower, to oscillate said cross feed screw and nut relatively in a cycle timed by the cam and a change speed mechanism to change the rate of feed of the grinding wheel into the work.

13. A cylindrical grinding machine comprising a base, a work support, a grinding wheel movable towards and from the work, a cross feed screw and a nut connected to move the wheel, a power driven mechanism, including a cam and a follower, effective to turn the screw and move the wheel in opposite directions in a cycle timed by the cam, and manually operable means for feeding the wheel into the work beyond the point to which it is moved by the cam mechanism.

14. A cylindrical grinding machine comprising a base, a work support thereon, a grinding wheel movable towards and from the work, mechanism, including a rotatable cam and a follower, connected to feed the wheel directly and continuously into and away from the work in a cycle timed by said cam and means for varying the length of the feeding stroke of the wheel into the work which is caused by said cam and follower acting through a full stroke.

15. A cylindrical grinding machine comprising a work support, a grinding wheel mounted to move towards and from the work and parallel with its own axis, a cross feed screw and a nut connected to move the wheel, mechanism, including a cam and a follower, operatively connected to turn the screw and nut relatively in opposite directions in a cycle timed by the cam and thereby move the wheel towards and from the work, and means operating automatically to reciprocate the wheel axially through a short distance during the grinding operation.

16. A grinding machine comprising a base, a slide thereon, a grinding wheel rotatably mounted on the slide, means to support the work in operative relation with the grinding wheel, a cross feed screw operatively connected to move the slide in both directions, means for yieldably turning the screw to feed the wheel into the work and a cam control device to regulate the rate of rotation of the screw and to move the grinding wheel away from the work.

17. A grinding machine comprising a base, a cross slide on said base, a grinding wheel thereon, means to support the work in operative relation with the wheel, a rotatable feed screw connected with the slide, a weight connected to rotate said screw and feed the wheel into the work, a positively rotated cam arranged to control the movement of the slide towards the work and to move it positively in the opposite direction.

18. A cylindrical grinding machine comprising a base, a grinding wheel and a work support thereon which are movable towards and from each other, a cross feed screw and a nut operatively connected to cause such movement, means for yieldingly turning the screw to feed the wheel into the work and power driven mechanism, including a cam and a follower, connected to regulate the rate of rotation of the screw in one direction and to move it positively in the opposite direction, and thereby cause the wheel to be fed into the work and removed therefrom in an invariable cam cycle.

19. A grinding machine comprising a base, a work support thereon, a grinding wheel mounted to move relative to the work, a cross feed screw and a nut connected to move the wheel, a rotatable cam, a cam follower therefor, and means including a lever operatively connected between the follower and the cross feed screw to rotate the latter in opposite directions in a cycle timed by said cam.

20. A grinding machine comprising a base, a work support thereon, a grinding wheel mounted to move relative to the work, a cross feed screw and a nut connected to move the wheel, a rotatable cam, a cam follower therefor, means including a lever operatively connected between the follower and the cross feed screw to rotate the latter in opposite directions in a cycle timed by the cam and means to adjust the effective length of an arm of the lever and thereby vary the effective length of stroke of the wheel movement relative to the work without changing the speed of the cam.

21. A grinding machine comprising a base, a slide thereon, a rotatable grinding wheel on the slide, a cross feed screw connected to move the slide in both directions, a power driven cam, a cam follower mounted on an arcuate lever and a chain and sprocket connection between the lever and the screw, which are so arranged that the effective length of the lever arm may be varied to change the length of wheel feeding stroke without changing the relative positions of wheel and work.

22. A grinding machine comprising a base, work supporting and rotating members which are relatively movable to grip a piece of work, a grinding wheel mounted to move towards and from the work, a cross feed screw and nut connected to cause the wheel movement, mechanism, including, a cam and a follower, operatively connected to rotate the cross feed screw and nut relatively in opposite directions in a cycle timed by the cam, and means to cause the work supporting members to grip and release the work in timed relation with the wheel movement.

23. A grinding machine comprising a base, work supporting and rotating members which are relatively movable to grip a piece of work, a grinding wheel mounted to move towards and from the work, a cross feed screw and nut connected to move the wheel, means, including a cam and a follower, operatively connected to oscillate the screw in opposite directions in a cycle timed by the cam, mechanism operating in timed relation with the cam movement to operate the work gripping members and means to adjust the time of operation of said mechanism relative to the cam movement.

24. A grinding machine comprising a base, work supporting and rotating members thereon which are relatively movable to grip a piece of work, mechanism movable to present pieces of work successively to said members, a grinding wheel movable relative to the work to grind the same, a crossfeed screw connected to feed the wheel into the work, mechanism, including a cam and a follower, operatively connected to move the screw in a cycle timed by the cam and thereby feed the wheel towards and from the work and mechanism operating in timed relation with the cam movement to actuate the work presenting mechanism and to move the work gripping members relatively when the wheel is out of contact with the work.

25. A grinding machine comprising a base, work supporting and rotating members thereon which are relatively movable to grip a piece of work, mechanism movable to present pieces of work successively to said members, a grinding wheel movable relative to the work to grind the same, a cross feed screw and a nut operatively connected to move the wheel, mechanism, including a cam and a follower, operatively connected to oscillate the screw in opposite directions in a cycle timed by the cam and mechanism operating in timed relation with the cam movement to actuate the work presenting mechanism and to move the work gripping members relatively when the wheel is out of contact with the work.

Signed at Worcester, Massachusetts, this 24th day of Sept., 1925.

CHARLES H. NORTON.

on which are relatively movable to grip a piece of work, mechanism movable to present pieces of work successively to said members, a grinding wheel movable relative to the work to grind the same, a cross feed screw and a nut operatively connected to move the wheel, mechanism, including a cam and a follower, operatively connected to oscillate the screw in opposite directions in a cycle timed by the cam and mechanism operating in timed relation with the cam movement to actuate the work presenting mechanism and to move the work gripping members relatively when the wheel is out of contact with the work.

Signed at Worcester, Massachusetts, this 24th day of Sept., 1925.

CHARLES H. NORTON.

CERTIFICATE OF CORRECTION.

Patent No. 1,779,823.                                Granted October 28, 1930, to

CHARLES H. NORTON.

It is hereby certified that error appears in the above numbered patent requiring correction as follows: Page 11, line 18, claim 6, after "follower" insert a comma; same page, line 79, claim 10, strike out the word "mechanism"; page 12, line 91, claim 22, after the word "including" strike out the comma.

In the drawings, at the bottom of sheet 1, insert "Witnesses Chas. H. Richards. Harold W. Eaton."; and that the said Letters Patent should be read with these corrections therein that the same may conform to the record of the case in the Patent Office.

Signed and sealed this 9th day of December, A. D. 1930.

(Seal)

M. J. Moore,
Acting Commissioner of Patents.

CERTIFICATE OF CORRECTION.

Patent No. 1,779,823.                               Granted October 28, 1930, to

CHARLES H. NORTON.

It is hereby certified that error appears in the above numbered patent requiring correction as follows: Page 11, line 18, claim 6, after "follower" insert a comma; same page, line 79, claim 10, strike out the word "mechanism"; page 12, line 91, claim 22, after the word "including" strike out the comma.

In the drawings, at the bottom of sheet 1, insert "Witnesses Chas. H. Richards. Harold W. Eaton."; and that the said Letters Patent should be read with these corrections therein that the same may conform to the record of the case in the Patent Office.

Signed and sealed this 9th day of December, A. D. 1930.

(Seal)
M. J. Moore,
Acting Commissioner of Patents.